(12) United States Patent
Bosco et al.

(10) Patent No.: US 9,132,469 B2
(45) Date of Patent: Sep. 15, 2015

(54) METHOD OF FORMING A FRONTAL TOOTHING ON AN INNER RING OF A WHEEL HUB

(75) Inventors: Domenico Bosco, Borgaro Torinese (IT); Davide Antonio Olivieri, Turin (IT); Marcello Rossi, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 351 days.

(21) Appl. No.: 13/546,619

(22) Filed: Jul. 11, 2012

(65) Prior Publication Data

US 2013/0174422 A1 Jul. 11, 2013

(30) Foreign Application Priority Data

Jul. 29, 2011 (IT) ................ TO2011A0700

(51) Int. Cl.

| B21D 31/00 | (2006.01) |
|---|---|
| B21D 53/10 | (2006.01) |
| B21D 53/26 | (2006.01) |
| B21K 1/40 | (2006.01) |
| B21K 21/12 | (2006.01) |
| B21K 25/00 | (2006.01) |
| B21J 5/00 | (2006.01) |
| B21J 5/12 | (2006.01) |
| B21J 9/02 | (2006.01) |
| B21J 13/02 | (2006.01) |
| B21K 1/30 | (2006.01) |

(52) U.S. Cl.
CPC ............. B21D 53/265 (2013.01); B21J 5/008 (2013.01); B21J 5/12 (2013.01); B21J 9/025 (2013.01); B21J 13/02 (2013.01); B21K 1/30 (2013.01); B21K 1/40 (2013.01); B21K 21/12 (2013.01); B21K 25/00 (2013.01); *Y10T 29/49535* (2015.01)

(58) Field of Classification Search
CPC ........ B21K 25/00; B21K 21/12; B21D 37/04; B21D 19/046; B21D 35/001; B21J 9/025; B21J 9/27; B21J 13/025
USPC ........ 72/403, 452.4, 442; 29/894.36, 894.361
See application file for complete search history.

(56) References Cited

U.S. PATENT DOCUMENTS

| 874,448 | A | * | 12/1907 | Smith .................... 29/893.35 |
|---|---|---|---|---|
| 4,893,960 | A | | 1/1990 | Beier et al. |
| 6,076,387 | A | * | 6/2000 | Siewert et al. .............. 72/69 |
| 6,996,907 | B2 | * | 2/2006 | Toda et al. ............ 29/898.062 |
| 7,117,598 | B2 | * | 10/2006 | Prucher .................... 29/893.2 |
| 7,832,940 | B2 | * | 11/2010 | Matsui et al. ............. 384/544 |
| 8,096,045 | B2 | * | 1/2012 | Gingrich .................... 29/724 |

FOREIGN PATENT DOCUMENTS

| FR | 2320798 A1 | 3/1977 |
|---|---|---|
| JP | 2000094082 A | 4/2000 |
| JP | 2011031682 A | 2/2011 |

* cited by examiner

*Primary Examiner* — Jason L Vaughan
(74) *Attorney, Agent, or Firm* — Bryan Peckjian; SKF USA Inc. Patent Dept.

(57) ABSTRACT

A method including the steps of forming an inner ring of the wheel hub, as the joining of a spindle and an insert ring fitted onto the spindle, on the side of a first end of the spindle; axially blocking the insert ring on the spindle by plastically deforming the first end of the spindle so as to form an upset collar therewith, which axially protrudes from the insert ring; and once the step of forming the upset collar has finished, frontally obtaining on the collar, on the side opposite to the insert ring, a frontal toothing by axially impressing on the collar one or more knives in sequence, carried in an axially sliding manner by a plate.

17 Claims, 4 Drawing Sheets

METHOD OF FORMING A FRONTAL TOOTHING ON AN INNER RING OF A WHEEL HUB

CROSS-REFERENCE TO RELATED APPLICATION

This United States Non-Provisional Utility application claims the benefit of copending Italy Provisional Patent Application Serial No. TO2011A000700, filed on 29 Jul. 2011, which is incorporated herein in its entirety.

FIELD OF THE INVENTION

The present invention relates to a method of forming a frontal toothing on an inner ring of a wheel hub by means of plastic deformation. In particular, the present invention is applied to a wheel hub, the inner ring having a spindle, provided with a first rolling race for a first crown of rolling bodies, and an insert ring, provided with a second rolling track for a second crown of rolling bodies, wherein the insert ring is axially blocked onto the spindle by means of an upset collar, defined by an end section of the spindle which was plastically deformed.

SUMMARY OF THE INVENTION

In the wheel hubs of the aforesaid type, the mentioned frontal toothing has the purpose of coupling head-to-head the inner ring of the wheel hub and a corresponding frontal toothing of an outer ring of a constant velocity joint, to ensure the torque transmission from the constant velocity joint to the inner ring of the wheel hub, which carries a wheel of the vehicle by means of a flanged end thereof. A coupling of this type is described in U.S. Pat. No. 4,893,960, which also teaches how to make the frontal toothing on the inner ring of the wheel hub. In particular, the frontal toothing is obtained using the so-called "orbital forming" method simultaneously with the forming of the upset collar by means of a tool including a truncated-cone-shaped element which upsets the collar and a frontally toothed tubular element, axially slidingly mounted on the truncated-cone-shaped element, which impresses the toothing onto the collar still during the step of deforming. A radially outer element of the toothed tubular element, which may either belong to the same tool or be a second separate tool, controls the radially outward deformation of the collar.

Although a forming method like that described in U.S. Pat. No. 4,893,960 is satisfactory, it requires the use of a relatively complex tool and does not provide toothings with features of absolute tooth profile constancy, which feature is absolutely necessary nowadays in view of the ever increasing transmitted torques.

It is thus the object of the present invention to provide a method of forming a frontal toothing on an inner ring of a wheel hub by means of plastic deformation, which is an alternative to the methods of the prior art, and in particular is capable of ensuring a higher dimensional accuracy of the teeth and maintaining a high dimensional and geometrical constancy in the profile of the teeth themselves.

According to a first aspect of the present invention, a method of forming a frontal toothing on an inner ring of a wheel hub by means of plastic deformation is thus provided.

The method comprises the steps of:
forming the inner ring of the wheel hub as the joining of a spindle and an insert ring fitted onto the spindle, on the side of a first end of the spindle;

axially blocking the ring on the spindle by plastically deforming the first end of the spindle so as to form an upset collar therewith, which axially protrudes from the ring; and
frontally impressing the frontal toothing onto the collar, on the side opposite to the ring; and
wherein the step of impressing the frontal toothing onto the collar is carried out only after the step of forming the upset collar, sequentially after the end of the step of forming the collar, directly onto the finished upset collar; and wherein combination, the step of impressing the frontal toothing is carried out by axially impressing, in sequence, one or more axially sliding, guided knives onto the collar.

The fact that, according to the invention, the frontal toothing is impressed by means of a plurality of knives, which are impressed on the upset collar in sequence, by moving them independently from one another, surprisingly provides frontal toothings by means of plastic deformation, in which the tooth profile is kept substantially constant, while ensuring a higher dimensional accuracy of the teeth thus obtained. Therefore, better and more accurate couplings are obtained between the inner ring of the wheel hub and the constant velocity joint, which allow more effective, quieter and higher capacity torque transmissions to be obtained.

Furthermore, the required frontal toothing is obtained with a lower energy consumption and, according to one of the embodiments of the invention, the same orbital forming apparatus used to make the upset collar can be used to actuate the knives.

BRIEF DESCRIPTION OF THE DRAWINGS

Further features and advantages of the present invention will become apparent from the following description of non-limitative embodiments, made with reference to the accompanying drawings, in which FIG. 1 diagrammatically shows in radial section a longitudinal elevation view of a wheel hub provided with a frontal toothing made according to the invention.

DETAILED DESCRIPTION OF THE INVENTION

Figure 1:
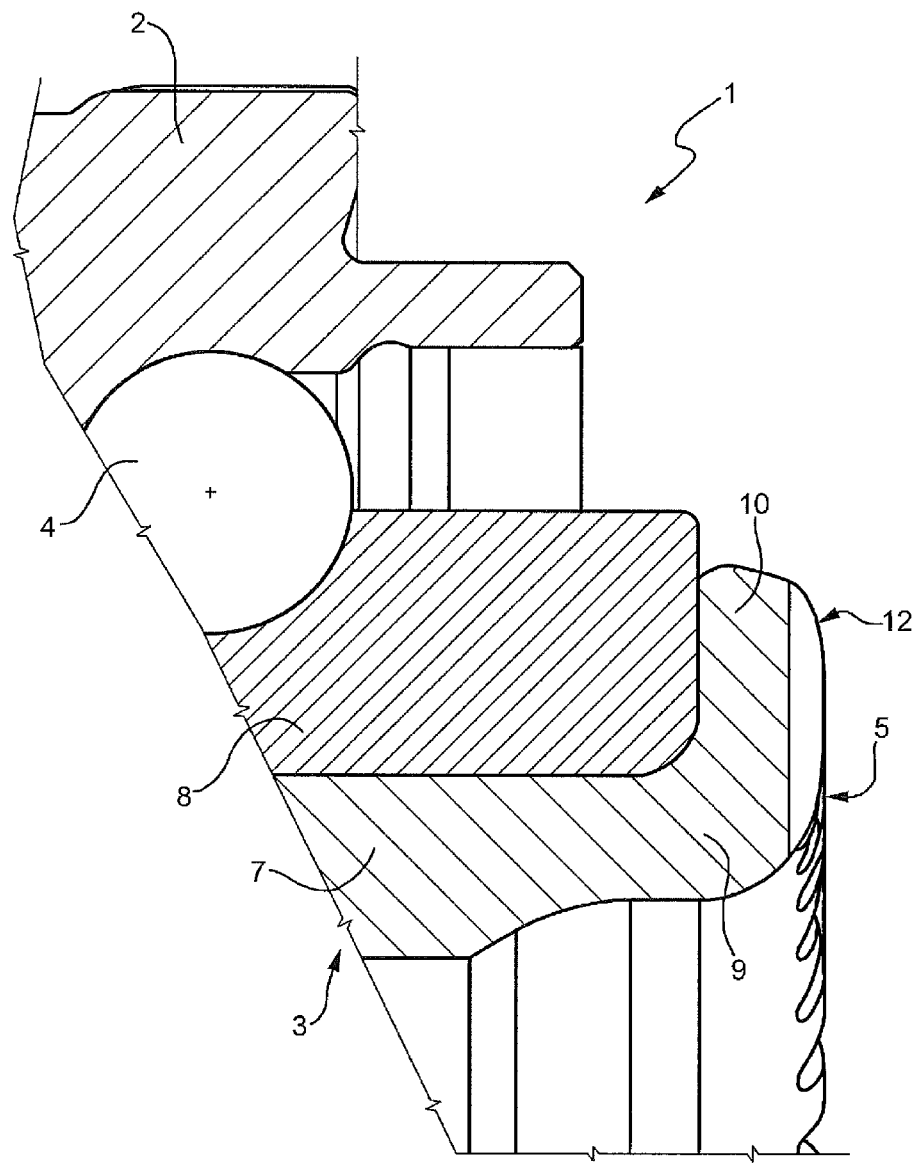

With reference to FIG. 1, numeral 1 indicates as a whole a wheel hub, known per se, comprising an outer ring 2, intended to be restrained in use to an upright of a vehicle suspension in a known manner, and an inner ring 3, between which two crowns of rolling bodies 4 are arranged (only one is shown in FIG. 1). The inner ring 3 can be operatively associated, in use, to a constant velocity joint (known and not shown for simplicity) by means of a frontal toothing 5 and is provided with holding means 6 defined by a flange (FIG. 2) for a vehicle wheel.

In particular, according to a known configuration, the inner ring 3 comprises a spindle 7, with which the flange 6 is integrally obtained in one piece, and an "insert" ring 8 fitted onto a terminal end 9 of the spindle 7 facing the opposite side of flange 6 and, in use, the mentioned constant velocity joint; inner ring 3, spindle 7 and ring 8 are reciprocally coaxial.

Ring 8 is axially blocked onto spindle 7 by means of an upset collar 10 obtained by means of plastic deformation of the terminal end 9; collar 10 axially protrudes from ring 8 and carries the frontal toothing 5 obtained on a terminal frontal face 12 thereof arranged substantially perpendicular to the axis of symmetry A (FIG. 2) of the wheel hub 1, in general, and of the inner ring 3, in particular.

Figure 2:
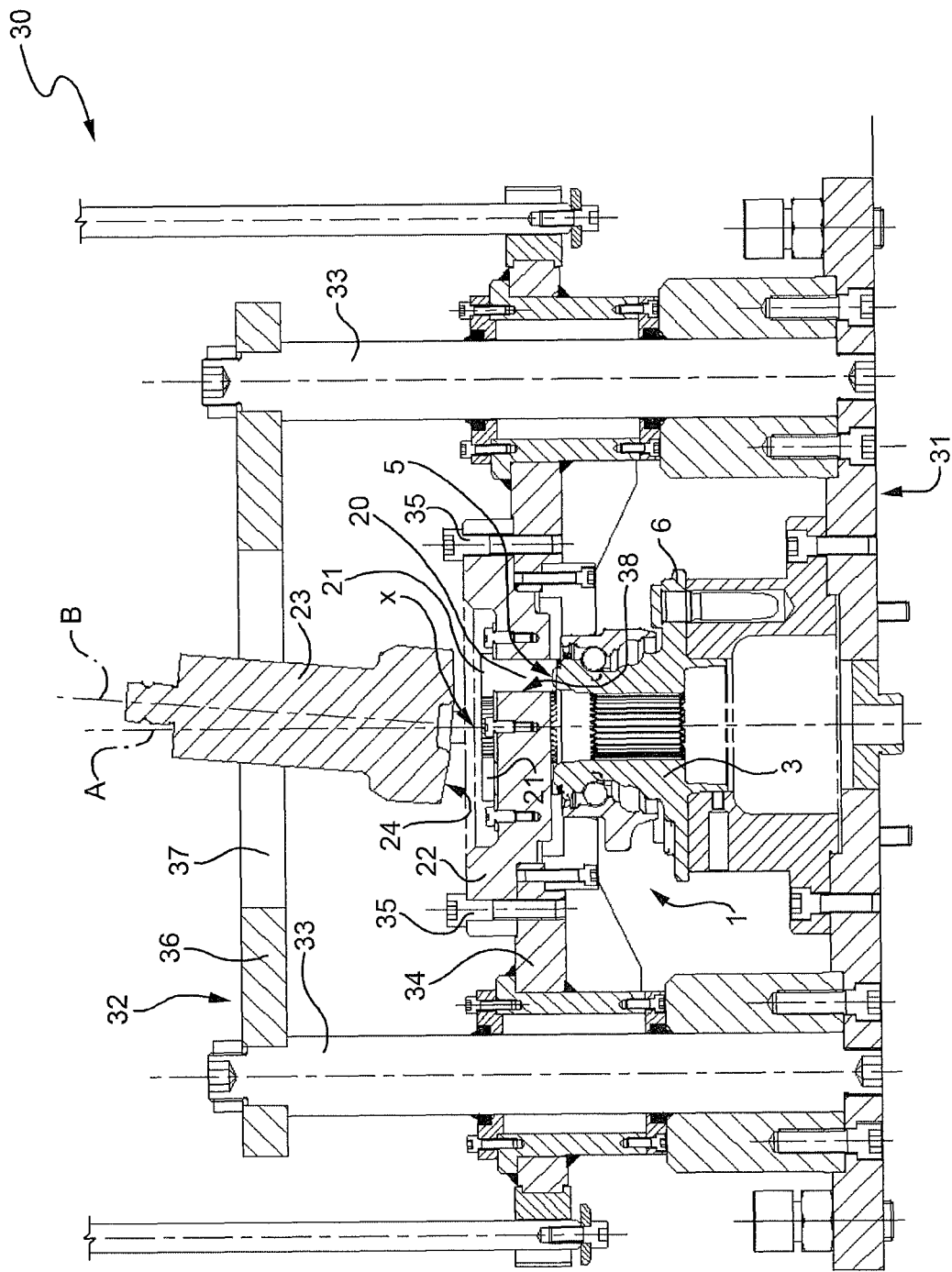
FIG. 2 shows on reduced scale the wheel hub in FIG. 1 during a step of the forming method according to the invention, and a diagrammatic elevation view in radial section of an apparatus to carry out the method of the invention.

With reference now to FIG. 2, toothing 5 is obtained by means of a method which greatly differs from those known from the prior art.

In particular, the method of forming the toothing 5 by means of plastic deformation according to the invention comprises the steps of: forming the inner ring 3 of the wheel hub 1 as the joining of spindle 7 and ring 8, and then axially blocking ring 8 onto spindle 7 by forming collar 10 by means of the plastic deformation of the end 9; this step is carried out in a known manner, e.g. using the so-called "orbital forming" process; and the step of frontally impressing the frontal toothing 5 onto collar 10, on the side opposite to ring 8.

However, according to the method of the present invention, the step of impressing the frontal toothing 5 onto collar 10 is carried out only after the step of properly forming the upset collar 10, in sequence after the end of such a step of forming collar 10, directly onto the finished upset collar 10.

In combination with this selection of a particular sequence of steps, the step of impressing the frontal toothing 5 is carried out by axially impressing one or more axially guided, sliding knives 20 on collar 10, in sequence.

Figure 4:
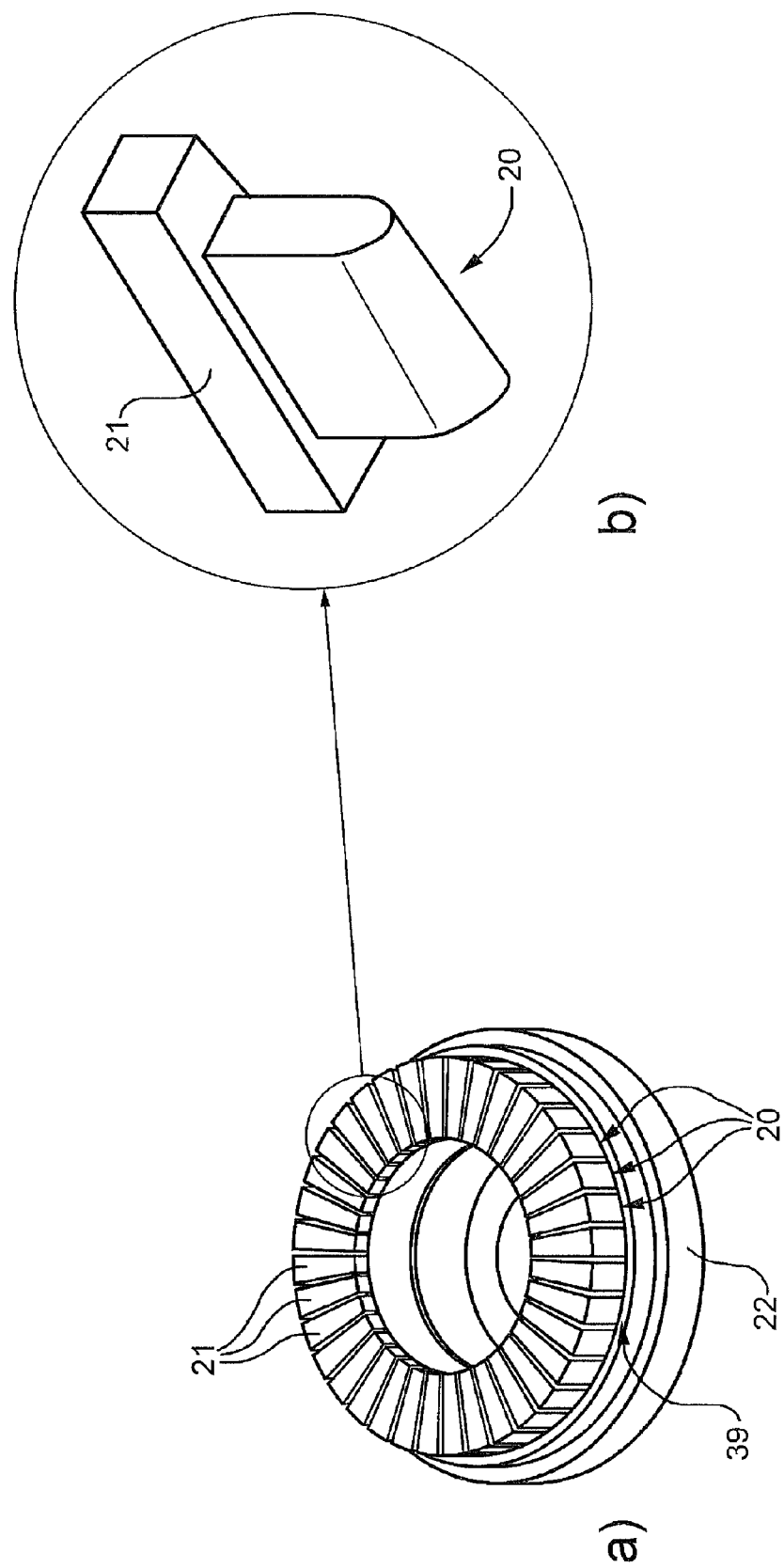
FIGS. 4a and 4b show on enlarged scale and only diagrammatically respective details of the apparatus in FIGS. 2 and 3.

During the step of forming the toothing 5, the knives 20 are held arranged in a crown, with respective heads 21 (FIG. 4) thereof, which are shaped as circular crown sectors, arranged immediately adjacent to one another, and are guided independently of one another, parallel to an axis of symmetry A of the wheel hub 1.

In particular, knives 20 are carried by a plate 22 (FIG. 4a) in an axially sliding manner; before impressing the knives 20 onto the upset collar 10, the plate is taken to a frontal abutting position against the collar 10 itself.

According to the embodiment shown in FIG. 2, the knives 20 are impressed onto collar 10, preferably one at a time, sequentially pressing onto the respective heads 21 thereof, arranged on the opposite side of collar 10, with a tool consisting of a pressing head 23 frontally delimited by a conical surface 24, by rotating head 23 about a first axis B arranged inclined with respect to the axis of symmetry A of the wheel hub 1, and simultaneously rotating axis B with a precession motion about the axis of symmetry A of the wheel hub 1; the point, indicated by X in FIG. 2, where the first axis B intercepts the axis of symmetry A is chosen so as to be substantially coplanar with the heads 21 of the knives 20.

In practice, an apparatus 30 (FIG. 2) similar to that used for the orbital forming of collar 10 is used to form toothing 5.

Indeed, according to the method of the invention, the wheel hub 1, which is at this point a finished assembly except for the toothing 5, is, during the step of impressing the knives 20 against the upset collar 10, axially and radially supported and blocked with respect to the axis of symmetry A thereof, and is further held with the inner ring 3 thereof angularly blocked, so that it cannot rotate about the axis of symmetry A.

For this purpose, apparatus 30 comprises a base 31, which supports a gantry-shaped frame 32 comprising columns 33, arranged preferably vertical, along which a crosspiece 34, which removably supports the plate 22 with the knives 20, e.g. by means of screws 35, runs parallel to axis A. The frame 32 further comprises a fixed crosspiece 36 fitted across the top of the columns 33 and provided with a through compartment 37 in which the head 23 may descend to come into cooperation with the heads 21 of the knives 20 and then be actuated in the described manner.

Ring 3 is directly supported in an integral manner by the base 31, e.g. by means of its flange 6, and the knives 20 are guided substantially without clearances within respective seats 38 of plate 22, obtained through the plate 22 and arranged as sectors of a circular crown. The radial and circumferential size of the heads 21 of knives 20 is larger than that of the knives 20, so as to prevent them from "falling" from plate 22. When the knives 20 are impressed against collar 10, the heads 21 abut against a flat top surface 39 of plate 22, so that the surface 39 acts as a high-accuracy stopper for the knives 20.

Figure 3:
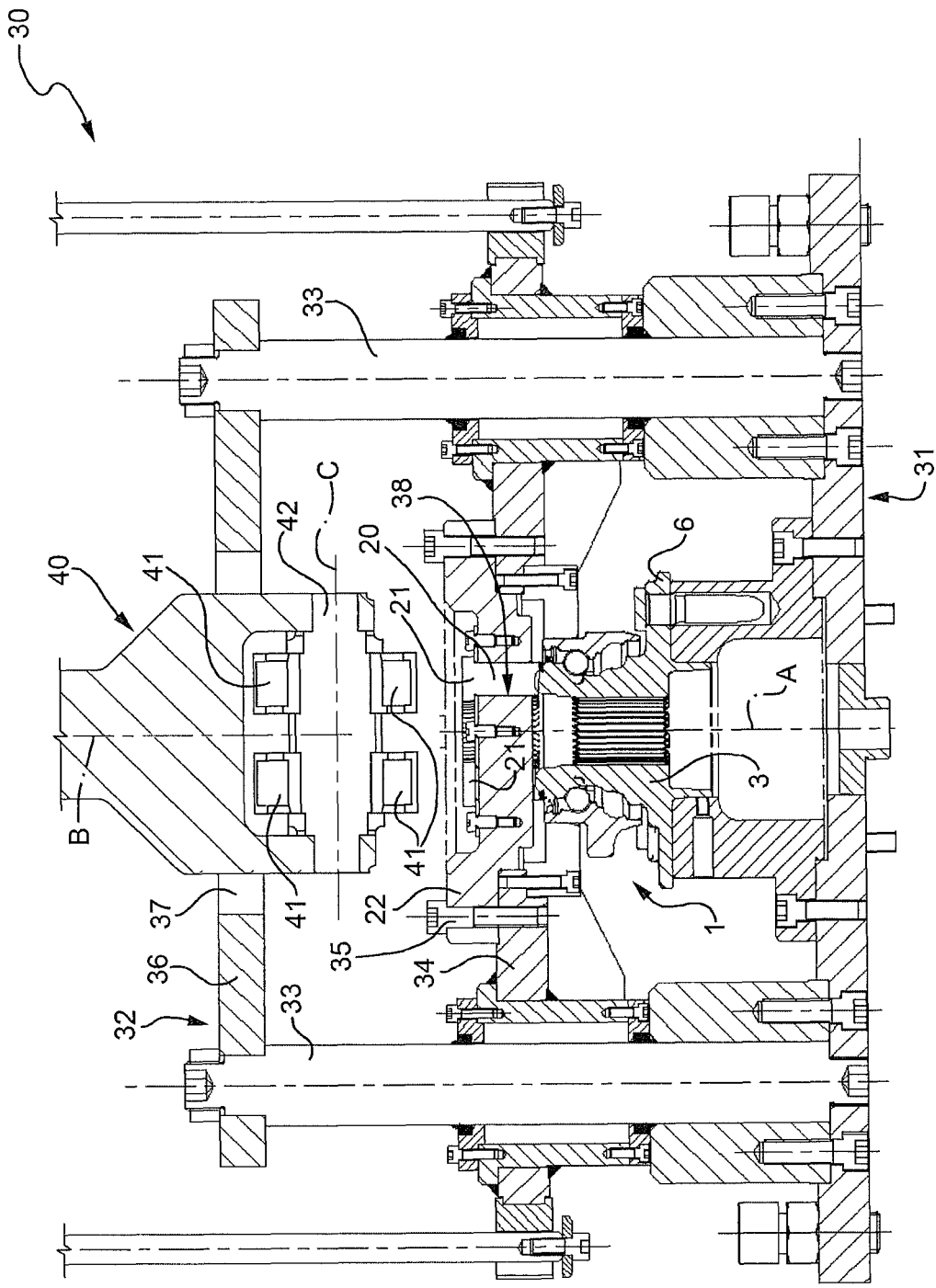
FIG. 3 shows a variant of the same step in FIG. 1 of the forming method according to the invention and a diagrammatic elevation view in radial section of a second apparatus to carry out the method of the invention according to such a variant.

FIG. 3 shows a possible variant of the invention; the details which are similar or equal to those already described are indicated using the same reference numbers for simplicity.

As shown in FIG. 3, the knives 20 are simultaneously impressed on collar 10 at least in pairs, by sequentially pressing onto the heads 21, arranged on the side opposite to collar 10, pairs of knives 20 arranged each time in a position which is diametrically opposite to the axis of symmetric A of the wheel hub 3.

In the case shown, an apparatus 30, entirely similar to that in FIG. 2 is used, and the knives 20, again carried by plate 22 which is supported by the movable crosspiece 34, are impressed against collar 10 by means of a tool consisting of a pressing head 40 rotating about an axis B coaxial to the axis of symmetry A of the wheel hub 3 and frontally provided, towards the heads 21 of knives 20, with two crowns of rolling bodies 41, specifically cylindrical rollers idly carried by a pin 42. The pressing head 40 is fork-shaped and the pin 42 is supported by head 40 across the rotation axis B, in this case pin 42 has an axis of symmetry C arranged perpendicular to axis B and parallel to surface 39.

The two crowns of rolling bodies 41 are arranged axially spaced apart from each other along the axis C of pin 42 by an amount substantially equal to the distance between the heads 21 of two knives 20 reciprocally diametrically opposite with respect to the axis of symmetry A of the wheel hub 1.

Given the desired type of frontal toothing 5, knives 20 (FIG. 4b) are used, both in the method of FIG. 2 and in the method of FIG. 3, which have a profile mating with that of the frontal toothing 5 to be obtained, and which are tapered in the radial direction both in height, i.e. in a direction parallel to the axis of symmetry B of the wheel hub 1, and in thickness, i.e. in a circumferential direction with respect to the axis of symmetry B.

We claim:

1. A method of forming, by plastic deformation, a frontal toothing on an inner ring of a wheel hub having an axis of rotation, comprising the steps of:
   forming the inner ring of the wheel hub by fitting an insert onto a first end of a spindle;
   axially blocking the insert on the spindle by plastically deforming the first end of the spindle to form an upset collar on the spindle, the upset collar having a first axial side overlying an axial end of the insert and a second axial side opposite the insert; and
   impressing the frontal toothing onto the second axial side of the upset collar,
   wherein the step of impressing the frontal toothing onto the second axial side of the upset collar is carried out only after the step of forming the upset collar, sequentially after the end of the step of forming the upset collar; and
   wherein in combination, the step of impressing the frontal toothing is carried out by axially impressing, in sequence, one or more axially sliding, guided knives onto the upset collar, and wherein the one or more knives are held arranged in a crown, each of the one or more knives having a head shaped as a circular crown sector arranged immediately adjacent to one another and wherein the one or more knives are guided independently of one another, parallel to the axis of rotation of the wheel hub.

2. The method according to claim 1, wherein the one or more knives are carried by a plate in an axially sliding manner, and prior to pressing the one or more knives onto the upset collar, the plate is positioned against the second axial side of the upset collar.

3. The method according to claim 1, wherein the one or more knives are impressed onto the upset collar one at a time in a sequence by pressing the one or more knives with a tool comprising a pressing head having a conical front surface, the method including rotating the pressing head about a first axis inclined with respect to the axis of rotation of the wheel hub, and simultaneously rotating the first axis with a precession motion about the axis of rotation of the wheel hub; a point where the first axis intercepts the axis of rotation of the wheel hub lying substantially in a plane of the heads of the one or more knives.

4. The method according to claim 1, wherein the one or more knives are simultaneously impressed onto the upset collar at least in pairs, by sequentially pressing on pairs of the one or more knives arranged diametrically opposite to each other with respect to the axis of rotation of the wheel hub.

5. The method according to claim 4, wherein the one or more knives are impressed onto the upset collar by a tool comprising a pressing head rotatable about an axis coaxial to the axis of rotation of the wheel hub the tool including two crowns of rolling bodies idly carried by a pin supported by the pressing head transversally to the axis of the pressing head; the two crowns of rolling bodies being axially spaced apart along the axis of the pin.

6. The method according to claim 1, wherein the wheel hub during the step of impressing the one or more axial sliding, guided knives onto the upset collar is axially and radially supported and blocked with respect to the axis of rotation, and is angularly blocked, such that the wheel hub cannot rotate about the axis of rotation.

7. The method according to claim 1, wherein the one or more knives are tapered in height and thickness.

8. The method according to, claim 1, wherein the one or more knives are tapered in a height direction, the height direction comprising a radial direction parallel to the axis of rotation of the wheel hub and are tapered in a thickness direction, the thickness direction comprising a circumferential direction with respect to the axis of rotation.

9. A method of forming, by plastic deformation, a frontal toothing on an inner ring of a wheel hub having an axis of rotation, the method comprising:

forming the inner ring of the wheel hub by fitting an insert onto a first end of a spindle;

axially blocking the insert on the spindle by plastically deforming the first end of the spindle to form an upset collar on the spindle, the upset collar having a first axial side facing an axial end of the insert and a second axial side facing away from the insert;

providing a tool comprising a plurality of knives arranged in a circle and, after the upset collar is formed, placing the tool at the second axial side of the upset collar, pressing at least individual ones of the plurality of knives into the upset collar to form the frontal toothing, and wherein the pressing includes axially sliding the at least individual ones of the plurality of knives relative to another of the plurality of knives.

10. The method according to claim 9, wherein each of the at least individual ones of the plurality of knives has a head shaped as a circular crown sector.

11. The method according to claim 9, wherein pressing the at least individual ones of the plurality of knives into the upset collar comprises sliding the at least individual ones of the plurality of knives in a direction parallel to the axis of rotation.

12. The method according to claim 9, including providing a pressing head having a longitudinal axis, a back end and a conical front surface spaced from the back end in the longitudinal direction of the pressing head, the method including placing the pressing head in direct or indirect contact with a first set of the plurality of knives, positioning the pressing head such that the longitudinal axis of the pressing head is inclined relative to the axis of rotation of the wheel hub, and rotating the pressing head about the longitudinal axis and revolving the back end of the pressing head around the axis of rotation of the wheel hub.

13. The method according to claim 9, wherein pressing at least individual ones of the plurality of knives into the upset collar comprises pressing pairs of the plurality of knives into the upset collar.

14. A method of forming, by plastic deformation, a frontal toothing on an inner ring of a wheel hub having an axis of rotation, the method comprising:

forming the inner ring of the wheel hub by fitting an insert onto a first end of a spindle;

axially blocking the insert on the spindle by plastically deforming the first end of the spindle to form an upset collar on the spindle, the upset collar having a first axial side facing an axial end of the insert and a second axial side facing away from the insert;

providing a plurality of knives in a collar, each of the plurality of knives having a cutting head;

providing a pressing head having a longitudinal axis, a back end and a conical front surface spaced from the back end in the longitudinal direction of the pressing head;

placing the pressing head adjacent to the plurality of knives, positioning the pressing head such that the longitudinal axis of the pressing head is inclined relative to the axis of rotation of the wheel hub, revolving the back end of the pressing head around the axis of rotation of the wheel hub while pressing the plurality of knives against the second axial side of the upset collar with the conical front surface of the pressing head, and wherein the pressing of the plurality of knives includes axially sliding at least one of the plurality of knives relative to another of the plurality of knives.

15. The method according to claim 14 wherein the plurality of knives are mounted for sliding movement in a collar and wherein pressing the plurality of knives against the second axial side of the upset collar comprises sliding the plurality of knives relative to the collar.

16. The method according to claim 14, wherein pressing the plurality of knives against the second axial side of the upset collar comprises pressing each of the plurality of knives individually into the upset collar.

17. The method according to claim 14, wherein pressing the plurality of knives against the second axial side of the upset collar comprises pressing pairs of the plurality of knives simultaneously into the upset collar.

* * * * *